(12) United States Patent
Shimakawa et al.

(10) Patent No.: US 12,445,210 B2
(45) Date of Patent: Oct. 14, 2025

(54) MOBILE TERMINAL TEST APPARATUS AND PARAMETER SETTING METHOD THEREOF

(71) Applicant: ANRITSU CORPORATION, Kanagawa (JP)

(72) Inventors: Nobuaki Shimakawa, Kanagawa (JP); Atsuki Morita, Kanagawa (JP); Masahiro Arayama, Kanagawa (JP); Daiki Kano, Kanagawa (JP); Daisuke Nakagawa, Kanagawa (JP); Takumi Nakamura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 476 days.

(21) Appl. No.: 18/062,101

(22) Filed: Dec. 6, 2022

(65) Prior Publication Data
US 2023/0198636 A1    Jun. 22, 2023

(30) Foreign Application Priority Data
Dec. 16, 2021    (JP) ................. 2021-204091

(51) Int. Cl.
*H04B 17/00*    (2015.01)
*H04L 5/00*     (2006.01)

(52) U.S. Cl.
CPC .......... *H04B 17/0087* (2013.01); *H04L 5/001* (2013.01)

(58) Field of Classification Search
CPC .. H04B 17/0085; H04B 17/15; H04B 17/201; H04B 17/29; H04B 17/294; H04B 17/3912

See application file for complete search history.

(56) References Cited

U.S. PATENT DOCUMENTS

| 2014/0242919 A1* | 8/2014 | Matsumoto ........ H04B 17/0085 455/67.14 |
| 2021/0297879 A1 | 9/2021 | Goto et al. |

FOREIGN PATENT DOCUMENTS

JP    2021-150924 A    9/2021

* cited by examiner

*Primary Examiner* — Tuan Pham
(74) *Attorney, Agent, or Firm* — McDonald Hopkins LLC

(57) ABSTRACT

There is provided a mobile terminal test apparatus capable of easily assigning and setting a frequency of each CC in the same frequency band of carrier aggregation. An operation unit 4 that accepts an operation input from a user, a display unit 5 that displays an image, and a control unit 6 that sets a contiguousness relationship of the plurality of component carriers and sets a predetermined premise parameter of the component carrier, and then automatically sets the parameter of the component carrier defined by a predetermined communication standard, by designating a type of the contiguousness relationship and a predetermined designation parameter are included.

5 Claims, 2 Drawing Sheets

MOBILE TERMINAL TEST APPARATUS AND PARAMETER SETTING METHOD THEREOF

TECHNICAL FIELD

The present invention relates to a mobile terminal test apparatus for testing a mobile terminal.

BACKGROUND ART

In a case where a mobile terminal such as a mobile phone or a data communication terminal is developed, it is necessary to test whether or not the developed mobile terminal can normally perform communication. Therefore, a mobile terminal as a device under test (DUT) is connected to a test apparatus that operates as a simulation base station that simulates a function of an actual base station, a test is performed such that communication is performed between the test apparatus and the mobile terminal and contents of this communication is checked.

In addition, the 3rd generation partnership project (3GPP), in which standards of wireless communication are created, has introduced a carrier aggregation technology in the standard of long term evolution-advanced (LTE-A). This carrier aggregation aims to improve a transmission speed by performing communication using a plurality of LTE carriers at the same time.

In the carrier aggregation, communication is performed by using a plurality of LTE carriers called component carriers (hereinafter, also referred to as CCs). In the carrier aggregation, communication is performed with one primary component carrier (hereinafter, also referred to as PCC), which is a CC necessary for a mobile terminal to maintain the connection with a base station, and one or more secondary component carriers (hereinafter, also referred to as SCCs), which is a CC used for improving the transmission speed between the mobile terminal and the base station.

The carrier aggregation can be classified into Intra-band contiguous CA (carrier aggregation by a plurality of CCs with continuous frequency assignment), Intra-band non-contiguous CA (carrier aggregation by a plurality of CCs with non-contiguous frequency assignment in the same frequency band), and Inter-band CA (carrier aggregation by a plurality of CCs with non-contiguous frequency assignment in different frequency bands), by assignment of a frequency of each CC.

Patent Document 1 discloses a technology of collectively setting a plurality of parameters for continuous frequency bandwidths over a plurality of CCs, such as Intra-band contiguous CA.

RELATED ART DOCUMENT

Patent Document

[Patent Document 1] JP-A-2021-150924

DISCLOSURE OF THE INVENTION

Problem that the Invention is to Solve

However, in such a mobile terminal test apparatus, although a setting Inter-band CA and Intra-band contiguous CA is easy, a configuration or a setting of Intra-band non-contiguous CA is not considered.

Thus, an object of the present invention is to provide a mobile terminal test apparatus capable of easily performing assignment and a setting a frequency of each CC in the same frequency band of carrier aggregation.

Means for Solving the Problem

According to the present invention, there is provided a mobile terminal test apparatus that constitutes carrier aggregation based on a parameter set for each of a plurality of component carriers to test a mobile terminal with the carrier aggregation, the mobile terminal test apparatus including: a control unit that sets a contiguousness relationship of the plurality of component carriers and sets a predetermined premise parameter of the component carrier, and then automatically sets the parameter of the component carrier defined by a predetermined communication standard, by designating a type of the contiguousness relationship and a predetermined designation parameter.

With this configuration, the parameter defined by the communication standard is automatically set, based on the premise parameter, the types of contiguousness relationship of the component carriers, and the designation parameter. Therefore, it is possible to easily assign and set a frequency of each CC in the same frequency band of carrier aggregation.

Further, in the mobile terminal test apparatus according to the present invention, in which in a case where contiguous is designated as the type of the contiguousness relationship, the control unit automatically sets the parameter of the component carrier to which contiguous is set, based on the contiguousness relationship of the plurality of component carriers.

With this configuration, in a case where contiguous is designated as the type of the contiguousness relationship, the control unit automatically sets the parameter of the component carrier to which contiguous is set, based on the contiguousness relationship of the plurality of component carriers. Therefore, it is possible to easily assign and set the frequency of each CC in the same frequency band of carrier aggregation.

Further, in the mobile terminal test apparatus according to the present invention, in which the predetermined designation parameter is any of Low Range, Mid Range, and High Range, and the parameter of the component carrier is a center frequency of each of the plurality of component carriers.

In addition, according to the present invention, there is provided a parameter setting method of a mobile terminal test apparatus that constitutes carrier aggregation based on a parameter set for each of a plurality of component carriers to test a mobile terminal with the carrier aggregation, the method including: a step of setting a contiguousness relationship of the plurality of component carriers; a step of setting a predetermined premise parameter of the component carrier; and a step of automatically setting the parameter of the component carrier defined by a predetermined communication standard by designating a type of the contiguousness relationship and a predetermined designation parameter.

With this configuration, the parameter defined by the communication standard is automatically set, based on the premise parameter, the types of contiguousness relationship of the component carriers, and the designation parameter.

Therefore, it is possible to easily assign and set the frequency of each CC in the same frequency band of carrier aggregation.

Advantage of the Invention

The present invention can provide a mobile terminal test apparatus capable of easily assigning and setting a frequency of each CC in the same frequency band of carrier aggregation.

BEST MODE FOR CARRYING OUT THE INVENTION

Hereinafter, a mobile terminal test apparatus according to an embodiment of the present invention will be described in detail with reference to the drawings.

Figure 1:
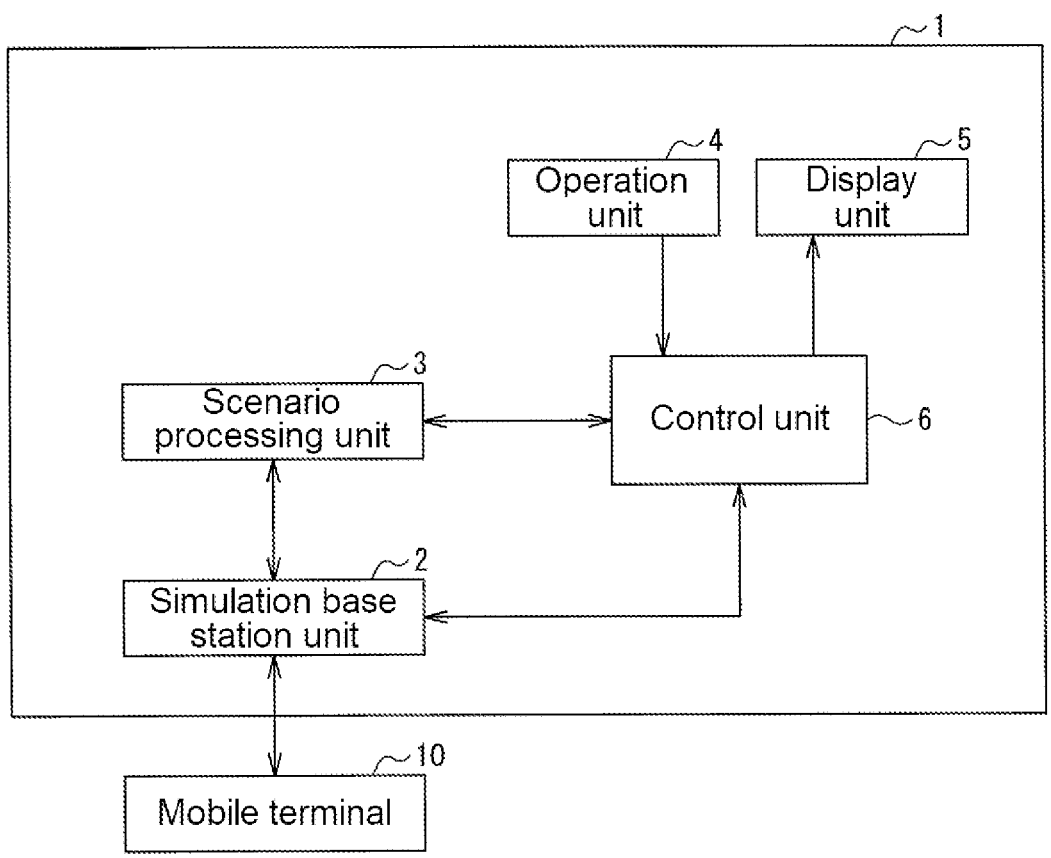
FIG. 1 is a block diagram of main parts of a mobile terminal test apparatus according to an embodiment of the present invention.

In FIG. 1, a mobile terminal test apparatus 1 according to an embodiment of the present invention is provided to transmit and receive RF (radio frequency) signals to and from a mobile terminal 10 in a wired manner via a coaxial cable or the like as a simulation base station. The mobile terminal test apparatus 1 may wirelessly transmit and receive the RF signals to and from the mobile terminal 10 via an antenna.

The mobile terminal test apparatus 1 includes a simulation base station unit 2, a scenario processing unit 3, an operation unit 4, a display unit 5, and a control unit 6.

The simulation base station unit 2 transmits and receives RF signals to and from the mobile terminal 10 under control of the scenario processing unit 3. The simulation base station unit 2 outputs a state or the like of communication with the mobile terminal 10 to the control unit 6.

The simulation base station unit 2 can perform 5G NR communication with the mobile terminal 10 according to the 5G NR standard. Alternatively, the simulation base station unit 2 may be capable of performing LTE-A communication with the mobile terminal 10 according to the LTE-A standard.

In accordance with an instruction from the control unit 6, the scenario processing unit 3 reads out a stored test scenario, and causes the simulation base station unit 2 to transmit notification information based on the test scenario or execute a communication sequence with the mobile terminal 10.

The operation unit 4 is configured with an input device such as a keyboard, a mouse, and a touch panel, and outputs information or the like necessary for generating a test scenario input by an operation, to the control unit 6. The display unit 5 is configured with an image display device such as a liquid crystal display, and displays an image for inputting information necessary for generating a test scenario, an image illustrating a state during a test, and the like.

In accordance with an instruction input to the operation unit 4, the control unit 6 causes the display unit 5 to display a creation screen for a test scenario to input information necessary for generating the test scenario, or generate the test scenario based on the information input to the operation unit 4 on the creation screen for the test scenario. In accordance with an instruction input to the operation unit 4, the control unit 6 transmits the instruction to the scenario processing unit 3 to execute a test based on a test scenario stored in a storage device or to cause the display unit 5 to display a state or the like during the test based on information such as a state of each layer or a state of communication with the mobile terminal 10 transmitted from the scenario processing unit 3.

Here, the mobile terminal test apparatus 1 is configured with a computer apparatus (not illustrated) provided with a communication module for communicating with the mobile terminal 10. This computer apparatus has each of a central processing unit (CPU), a read only memory (ROM), a random access memory (RAM), a storage device such as a hard disk device, an input and output port, and a touch panel (not illustrated).

A program for causing the computer apparatus to function as the mobile terminal test apparatus 1 is stored in the ROM and the hard disk device of the computer apparatus. That is, the computer apparatus functions as the mobile terminal test apparatus 1 by the CPU executing the program stored in the ROM by using the RAM as a work region.

In this manner, in the present embodiment, the scenario processing unit 3 and the control unit 6 are configured with the CPU, and the simulation base station unit 2 is configured with the communication module.

In the mobile terminal test apparatus 1 having such a configuration, in a case of performing a carrier aggregation test, the control unit 6 performs assignment and a setting of a frequency of each CC.

For example, the control unit 6 first sets a contiguousness relationship of each CC. The control unit 6 sets the contiguousness relationship of each CC by using, for example, a screen as illustrated in FIG. 2.

Based on the set number of the CC, the control unit 6 causes the display unit 5 to display rectangles representing the CCs by the number of CCs. In FIG. 2, a rectangle 100 indicating a PCC, and rectangles 101, 102, 103, and 104 indicating SCCs 1 to 4 are displayed. These rectangles can be moved in a lateral direction by an operation of the operation unit 4 by a user, so that the rectangles can be placed to be contiguous to each other or separated from each other.

Figure 2:
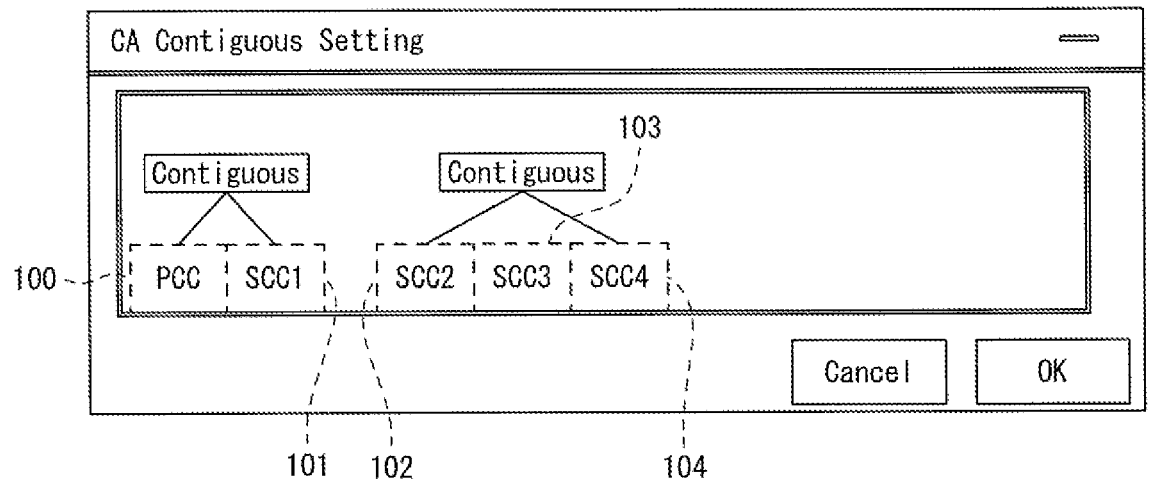
FIG. 2 is a diagram illustrating an example of a screen for setting a contiguousness relationship of CCs of the mobile terminal test apparatus according to the embodiment of the present invention.

In a case where the rectangle 100 indicating the PCC and the rectangle 101 indicating the SCC1 are disposed to be contiguous to each other as illustrated in FIG. 2, a type of contiguousness relationship between the PCC and the SCC1 is contiguous, and the control unit 6 sets contiguous in frequency by the operation of the operation unit 4 by the user.

In the same manner, as illustrated in FIG. 2, in a case where the rectangle 102 indicating the SCC2, the rectangle 103 indicating the SCC3, and the rectangle 104 indicating the SCC4 are disposed to be contiguous to each other, a type of contiguousness relationship between SCC2, SCC3, and SCC4 is contiguous, and contiguous in frequency is set.

Next, the control unit 6 performs a setting of each CC, for example. The control unit 6 sets a parameter of the CC as a premise parameter, for example, "Operating Band" for designating a frequency band of a device under test (DUT), "SCS:SubCarrier Spacing" for designating an interval of subcarriers, "CBW:Carrier BandWidth" for designating a frequency bandwidth of the CC, and "SS (Synchronisation Signal) block SCS" for designating an interval of the subcarriers of a synchronization signal block, and the like.

Next, the control unit 6 automatically sets a parameter of a testing signal of a predetermined communication standard, for example, based on the set premise parameter. For example, based on the set parameter, the control unit 6 automatically sets a parameter for a testing signal defined in standards such as section 4.3.1.1 or section 4.3.1.2 of 3GPP TS 38.508-1 and the like.

Figure 3:
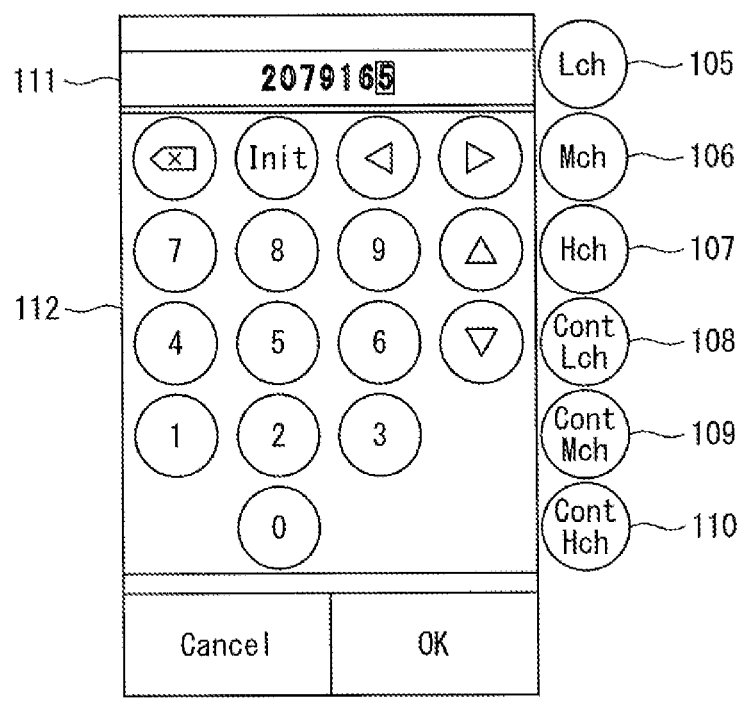
FIG. 3 is a diagram illustrating an example of a screen for setting a center frequency of the CC of the mobile terminal test apparatus according to the embodiment of the present invention.

For example, the control unit 6 automatically sets a parameter of a testing signal, by an input of the user on a screen illustrated in FIG. 3 for setting a center frequency of each CC.

The control unit 6 selects, for example, any one of PCC, SCC1, SCC2, SCC3, and SCC4 in FIG. 2 to set the center frequency of the CC. For example, when the setting of the center frequency of any CC is selected, the control unit 6 causes the display unit 5 to display the screen as illustrated in FIG. 3.

In FIG. 3, when a LowRange setting unit 105 is selected, the control unit 6 determines that non-contiguous is designated as a type of contiguousness relationship and Low Range is designated as a designation parameter. Based on the set parameter and a definition of a standard, for example, in a case where Operating Band is n78, SCS is 30 kHz, CBW is 10 MHz, and SS block SCS is 30 kHz, the control unit 6 sets the center frequency to 3305.01 MHz, and also sets the parameters such as "Carrier centre[ARFCN]", "point A[MHz]", "absoluteFrequencyPointA[ARFCN]", "offset-ToCarrier [Carrier PRBs]", "GSCN", "absoluteFrequencySSB[ARFCN]", and "kSSB" to values according to the standard.

When a MidRange setting unit 106 is selected, the control unit 6 determines that non-contiguous is designated as the type of contiguousness relationship and Mid Range is designated as the designation parameter. Based on the set parameter and the definition of the standard, for example, in a case where Operating Band is n78, SCS is 30 kHz, CBW is 10 MHz, and SS block SCS is 30 kHz, the control unit 6 sets the center frequency to 3549.99 MHz, and also sets the other parameters described above to the values according to the standard.

When a HighRange setting unit 107 is selected, the control unit 6 determines that non-contiguous is designated as the type of contiguousness relationship and High Range is designated as the designation parameter. Based on the set parameter and the definition of the standard, for example, in a case where Operating Band is n78, SCS is 30 kHz, CBW is 10 MHz, and SS block SCS is 30 kHz, the control unit 6 sets the center frequency to 3795 MHz, and also sets the other parameters described above to the values according to the standard.

When a ContLowRange setting unit 108 is selected, the control unit 6 determines that contiguous is designated as the type of contiguousness relationship and Low Range is designated as the designation parameter. Based on the set parameter and the definition of the standard, for example, in a case where Operating Band is n78, SCS is 30 kHz, CBW of the PCC is 50 MHz, SS block SCS is 30 kHz, and CBW of the SCC1 is 60 MHz in a state in which the PCC or the SCC1 is selected in the setting of FIG. 2, the control unit 6 sets the center frequency of the PCC to 3325.02 MHz and the center frequency of the SCC1 to 3379.98 MHz, and also sets the other parameters described above to the values according to the standard.

When a ContMidRange setting unit 109 is selected, the control unit 6 determines that contiguous is designated as the type of contiguousness relationship and Mid Range is designated as the designation parameter. Based on the set parameter and the definition of the standard, for example, in a case where Operating Band is n78, SCS is 30 kHz, CBW of the PCC is 50 MHz, SS block SCS is 30 kHz, and CBW of the SCC1 is 60 MHz in a state in which the PCC or the SCC1 is selected in the setting of FIG. 2, the control unit 6 sets the center frequency of the PCC to 3519.99 MHz and the center frequency of the SCC1 to 3574.95 MHz, and also sets the values of the other parameters described above according to the standard.

When a ContHighRange setting unit 110 is selected, the control unit 6 determines that contiguous is designated as the type of contiguousness relationship and High Range is designated as the designation parameter. Based on the set parameter and the definition of the standard, for example, in a case where Operating Band is n78, SCS is 30 kHz, CBW of the PCC is 50 MHz, SS block SCS is 30 kHz, and CBW of the SCC1 is 60 MHz in a state in which the PCC or the SCC1 is selected in the setting of FIG. 2, the control unit 6 sets the center frequency of the PCC to 3715.02 MHz and the center frequency of the SCC1 to 3769.98 MHz, and also sets the values of the other parameters described above according to the standard.

In FIG. 3, a center frequency display unit 111 displays the value of the set center frequency, and the center frequency can be changed by a key operation of a center frequency input unit 112.

In addition, in a case where the PCC is selected in the setting of FIG. 2, Operating Band is n78, SCS is 30 kHz, CBW of the PCC is 50 MHz, SS block SCS is 30 kHz, and CBW of the SCC1 is 60 MHz, the control unit 6 sets the center frequency of the PCC to 3325.02 MHz and the center frequency of the SCC1 to 3379.98 MHz when a ContLowRange setting unit 108 is selected.

After that, when the HighRange setting unit 107 is selected, the control unit 6 sets the center frequency of the PCC to 3774.99 MHz, and maintains the center frequency of the SCC1 at 3379.98 MHz. At this time, a contiguousness relationship of the CCs illustrated in FIG. 2 is not changed. That is, the setting illustrated in FIG. 2 defines a combination of the CCs when any one of the ContLowRange setting unit 108, the ContMidRange setting unit 109, and the ContHighRange setting unit 110 is selected.

In this manner, in the embodiment described above, the control unit 6 sets a contiguousness relationship of the CCs, and sets "Operating Band", "SCS:SubCarrier Spacing", "CBW:Carrier BandWidth", "SS(Synchronisation Signal) block SCS", and the like as the parameter of the CC, and then designates the type of contiguousness relationship and Range of the frequency to automatically set the parameters defined by the communication standard.

As a result, the parameters are automatically set by designating the type of contiguousness relationship and Range of the frequency. Therefore, it is possible to easily assign and set the frequency of each CC in the same frequency band of carrier aggregation.

Further, in a case where contiguous is designated, the control unit 6 also automatically sets the parameter of the CC to which contiguous is set, based on the setting of the contiguousness relationship of the CC.

As a result, when contiguous is designated, the parameter of the CC to which contiguous is set is also automatically set. Therefore, it is possible to easily assign and set the frequency of each CC in the same frequency band of carrier aggregation.

Although the embodiment of the present invention is disclosed, it is apparent that the embodiment can be modified by those skilled in the art without departing from the scope of the present invention. All such modifications and equivalents are intended to be included in the following claims.

DESCRIPTION OF REFERENCE NUMERALS AND SIGNS 1 mobile terminal test apparatus
4 operation unit
5 display unit
6 control unit
10 mobile terminal
105 LowRange setting unit
106 MidRange setting unit
107 HighRange setting unit
108 ContLowRange setting unit
109 ContMidRange setting unit
110 ContHighRange setting unit

What is claimed is:

1. A mobile terminal test apparatus that constitutes carrier aggregation based on a parameter set for each of a plurality of component carriers to test a mobile terminal with the carrier aggregation, the mobile terminal test apparatus comprising:
a control unit that sets a contiguousness relationship of the plurality of component carriers and sets a predetermined premise parameter of the component carrier, and then automatically determines and sets the parameter of the component carrier defined by a predetermined communication standard, by designating a type of the contiguousness relationship and a predetermined designation parameter.

2. The mobile terminal test apparatus according to claim 1, wherein in a case where contiguous is designated as the type of the contiguousness relationship, the control unit automatically determines and sets the parameter of the component carrier to which contiguous is set, based on the contiguousness relationship of the plurality of component carriers.

3. The mobile terminal test apparatus according to claim 1, wherein the predetermined designation parameter is any of Low Range, Mid Range, and High Range, and the parameter of the component carrier is a center frequency of each of the plurality of component carriers.

4. The mobile terminal test apparatus according to claim 2, wherein the predetermined designation parameter is any of Low Range, Mid Range, and High Range, and the parameter of the component carrier is a center frequency of each of the plurality of component carriers.

5. A parameter setting method of a mobile terminal test apparatus that constitutes carrier aggregation based on a parameter set for each of a plurality of component carriers to test a mobile terminal with the carrier aggregation, the method comprising:
a step of setting a contiguousness relationship of the plurality of component carriers;
a step of setting a predetermined premise parameter of the component carrier;
a step of automatically determining the parameter of the component carrier defined by a predetermined communication standard, by designating a type of the contiguousness relationship and a predetermined designation parameter, and
a step of automatically setting the parameter of the component carrier.

* * * * *